United States Patent
Patil et al.

(10) Patent No.: US 10,081,135 B2
(45) Date of Patent: Sep. 25, 2018

(54) FUSER AND SEALER INTEGRATED SYSTEM

(71) Applicant: GE Healthcare Bio-Sciences AB, Uppsala (SE)

(72) Inventors: Haresh Digambar Patil, Bangalore (IN); Partha Sarathy Doddapadam Srinivasa Raghavachar, Bangalore (IN); Ganesan Mariyappan, Bangalore (IN); Prashanth Hosabettu Mohan, Bangalore (IN)

(73) Assignee: GE HEALTHCARE BIO-SCIENCES AB, Uppsala (SE)

( * ) Notice: Subject to any disclaimer, the term of this patent is extended or adjusted under 35 U.S.C. 154(b) by 0 days.

(21) Appl. No.: 15/129,157

(22) PCT Filed: Feb. 19, 2015

(86) PCT No.: PCT/SE2015/050193
§ 371 (c)(1),
(2) Date: Sep. 26, 2016

(87) PCT Pub. No.: WO2015/152789
PCT Pub. Date: Oct. 8, 2015

(65) Prior Publication Data
US 2017/0113402 A1   Apr. 27, 2017

(30) Foreign Application Priority Data
Apr. 2, 2014   (IN) .............................. 962/DEL/2014

(51) Int. Cl.
*B29C 65/00* (2006.01)
*B29C 65/78* (2006.01)
(Continued)

(52) U.S. Cl.
CPC ...... *B29C 66/5221* (2013.01); *B29C 65/2046* (2013.01); *B29C 65/7802* (2013.01);
(Continued)

(58) Field of Classification Search
CPC ............ B29C 66/5221; B29C 66/7802; B29C 66/861; B29C 65/7841
See application file for complete search history.

(56) References Cited

U.S. PATENT DOCUMENTS

| | | |
|---|---|---|
| 4,793,880 A | 12/1988 | Shaposka et al. |
| 7,779,880 B2 * | 8/2010 | Sano .................. B29C 65/2046 |
| | | 156/251 |
| 2004/0251575 A1 | 12/2004 | St. Onge et al. |

FOREIGN PATENT DOCUMENTS

| | | |
|---|---|---|
| CN | 1816438 | 8/2006 |
| EP | 0134630 A1 | 3/1985 |

(Continued)

OTHER PUBLICATIONS

International Search Report and Written Opinion regarding International Application No. PCT/SE2015/050193, dated Jul. 20, 2015, 15 pages.

(Continued)

*Primary Examiner* — Mark A Osele
*Assistant Examiner* — Christopher C Caillouet
(74) *Attorney, Agent, or Firm* — Wood IP LLC

(57) ABSTRACT

An integrated system for fusing and sealing of a plurality of tubes is disclosed. The integrated system includes one or more fusing units configured to cut one or more tubes of multiple tubes simultaneously, and fusing the one or more tubes together along their respective cut ends; one or more sealing units configured to seal an end of the tube of the (Continued)

multiple tubes; and a control unit for controlling functions of the one or more fusing units and the one or more sealing units.

24 Claims, 9 Drawing Sheets

(51) Int. Cl.
*B29C 65/20* (2006.01)
*B29L 23/00* (2006.01)

(52) U.S. Cl.
CPC .... *B29C 65/7841* (2013.01); *B29C 66/73921* (2013.01); *B29C 66/861* (2013.01); *B29L 2023/22* (2013.01)

(56) References Cited

FOREIGN PATENT DOCUMENTS

| EP | 0471953 | A2 | 2/1992 |
| EP | 0507321 | A1 | 10/1992 |
| EP | 0515811 | A2 | 12/1992 |
| WO | 2005102671 | A1 | 11/2005 |

OTHER PUBLICATIONS

European Search Report received for European Patent Application No. 15772207.5, dated Feb. 28, 2017, 8 pages.
First Chinese Office Action Received for Chinese Patent Application 201580018223.3 dated Apr. 4, 2018, 11 pages (6 pages Official Copy + 5 Pages English Translation).

* cited by examiner

FUSER AND SEALER INTEGRATED SYSTEM

CROSS-REFERENCE TO RELATED APPLICATIONS

This application is a filing under 35 U.S.C. 371 of international application number PCT/SE2015/050193, filed Feb. 19, 2015, which claims priority to IN application number 962/DEL/2014, filed Apr. 2, 2014, the entire disclosures of each of which are hereby incorporated by reference.

FIELD OF THE INVENTION

The subject matter disclosed herein relates to sealing and fusing tubes or pipe used in bioprocess equipment.

BACKGROUND OF THE INVENTION

Bioprocessing involves usage of complete living cells such as bacteria, enzymes and chloroplast to obtain desired products. Bioprocessing includes multiple stages such as fermentation, buffer media, filtration, formulation and filing and so on. Bioprocessing includes upstream bioprocessing and downstream bioprocessing. The upstream process is a process that involves early cell isolation and cultivation, to cell banking and culture expansion of the cells until final harvest (termination of the culture and collection of the live cell batch. The upstream bioprocess involves growing microbes/cells, e.g. bacterial or mammalian cell lines in bioreactors. This process involves all the steps related with inoculum development, media development, improvement of inoculum by genetic engineering process, optimization of growth kinetics so that product development can improve tremendously. Fermentation process includes two parts i.e. upstream and downstream processes. After product development, the next step is purification of product for desired quality. When they reach the desired density they are harvested and moved to the downstream section of the bioprocess. The downstream bioprocess refers to a process where the cell mass from the upstream are processed to meet purity and quality requirements. Downstream processing is usually divided into three main sections i.e. cell disruption, purification section and polishing section. The volatile products can be separated by distillation of the harvested culture without pre-treatment. Distillation is done at reduced pressure at continuous stills. At reduced pressure distillation of product directly from fermenter may be possible.

Traditional bioprocess uses dedicated series of bioreactors linked together with valves and rigid piping for production. A cleaning system is installed within each bioreactor, vessel and piping line to remove residual materials. Further sterility assurance at the start of each culture is achieved by a steam in place system including steam pipes, temperature sensors, and condensate collecting pipe. Both the cleaning system and the steam in place system require extensive validation testing. Also the valves and pipes require more validations. These valves and pipes need significant maintenance and changes that amounts to revalidation.

Multiple bio-reactors may be connected using tubes and pipes. These tubes and pipes are mostly single use and need to be sterile. The tubes used may be thermoplastic tubes. The connections between bio-reactors, containers, tube sets, and bioprocess equipments are completed using aseptic connectors. The connectors also need to be sterilized if reused or need to be disposed-off after one use. Multiple tubes may be connected to each other using aseptic connection i.e. a tube welder or fuser in a sterile manner. The fuser or a fusing device is typically a large size device that can connect different tubes of varying diameters. The device can perform fully automated operations and they can do thermal welding with exception strength. The fuser device is typically heavy which restricts its mobility.

Sealers are used to seal connections of bags and other containers for storage and transportation. These sealing needs to be leak proof and tamper proof to ensure that media, buffer or products do not leak through the tubing clamps, plugs or hemostats during transportation and storage. Sealers are also typically table top devices and are bulky. Also separate devices for sealing and fusing needs to be carried by the user for performing in these operations for fusing tubes and sealing a tube used in bioprocessing environment. These can make the activities of sealing and fusing more labor some. Moreover, in general there is a need for having two separate devices i.e. a fuser and a sealer to perform fusing and sealing operations for aseptic connections which results in big capital investments, requires more space and also flexibility is lost.

Therefore, there is a need for an improved system for sealing and fusing tubes or pipe used in bioprocess equipments.

SUMMARY OF THE INVENTION

The object of the invention is to provide a system for fusing and sealing a plurality of tubes, which overcomes one or more drawbacks of the prior art. This is achieved by an integrated system for fusing and sealing a plurality of tubes used in bioprocess techniques in the independent claim.

One advantage with the disclosed integrated system is a single system that includes a fusing unit for fusing multiple tubes and a sealing unit for sealing an end of the tube.

According to some embodiments there is provided an integrated system for fusing and sealing of a plurality of tubes. The integrated system includes one or more fusing units configured to cut one or more tubes of multiple tubes simultaneously, and fusing the one or more tubes together along their respective cut ends; one or more sealing units configured to seal an end of the tube of the multiple tubes; and a control unit for controlling functions of the one or more fusing units and the one or more sealing units.

According to certain embodiments the fusing unit includes one or more holder, wherein each holder is capable of receiving and holding a portion of a tube of the multiple tubes; and a cutting blade for cutting a portion of the tube received in each holder of at least two holders simultaneously, wherein the cutting blade is a heated blade; and a driving assembly configured to operate the cutting blade for cutting the tube received in each holder; and align the at least two holders for orienting the respective ends of the tubes to face each other; and moving the ends of the tubes to contact each other for fusing.

According to some embodiments the drive assembly includes a first cam member operatively connected to the cutting blade; a second cam member operatively connected to the at least two holders for linear movement; a carriage unit movably engaged with the second cam member and the at least two holders; a blade mover connected to the first cam member and the cutting blade; a motor unit operatively connected to the first cam member and the second cam member, wherein during operation the motor unit drives the first cam member to operate the blade mover for moving the cutting blade in a vertical axis for cutting a portion of the at least two tubes held in the at least two holder; and drives the second cam member to operate the carriage unit for aligning the at least two holder so as to orient the respective cut ends of the tubes to face each other.

According to some embodiments the sealing unit includes a first seal pad arranged in a stationary position; a second seal pad arranged oppositely facing the first seal pad. The second seal pad is configured to move closer to the first seal pad to seal an end of the tube of the multiple tubes positioned between the first seal pad and the second seal pad. A seal driving assembly is connected to the second seal pad for controlling the movement of the second seal pad.

According to certain embodiments the second cam member comprises a protruding member, wherein in response to driving the second cam member the protruding member directs the carriage unit for aligning the at least two holders to fuse the at least two tubes together along their respective cut ends.

According to some embodiments the sealing unit further comprises at least one spring engaged to the second seal pad for providing pressure to seal the end of tube; and at least one spring engaged to the first seal pad, wherein the at least one spring engaged to the second seal pad and the at least one spring engaged to the second seal pad are configured to deflect for accommodating the end of the tube between the first seal pad and the second seal pad.

According to certain embodiments the seal driving assembly comprises a trigger holder operable by a user; and an actuating member engaged to an end of the trigger holder and connected to the second seal pad, wherein upon operating the trigger holder the actuating member moves the second seal pad.

According to some embodiments an alternate driving assembly includes a gear train connected to the first holder, the second holder and the cutting blade; and a motor for operating the gear train.

According to other embodiments the gear train comprises a connecting shaft connected to the motor; a sector gear mounted on the connecting shaft; an aligning gear mounted on the connecting shaft; a pinion gear arranged meshing with the aligning gear and configurable to mesh with the sector gear; and an encoder mounted on the connecting shaft to collect and send feedback on the fusing function to the control unit A more complete understanding of the present invention, as well as further features and advantages thereof, will be obtained by reference to the following detailed description and drawings.

DETAILED DESCRIPTION OF THE INVENTION

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized and that logical, mechanical and other changes may be made without departing from the scope of the embodiments. The following detailed description is, therefore, not to be taken as limiting the scope of the invention.

As discussed in detail below, embodiments of the invention including an integrated system for fusing and sealing of a plurality of tubes. The integrated system includes a fusing unit configured to cut one or more tubes of multiple tubes simultaneously, and fusing the one or more tubes together along their respective cut ends; a sealing unit configured to seal an end of the tube of the multiple tubes; and a control unit for controlling functions of the fusing unit and the sealing unit.

Figure 1:
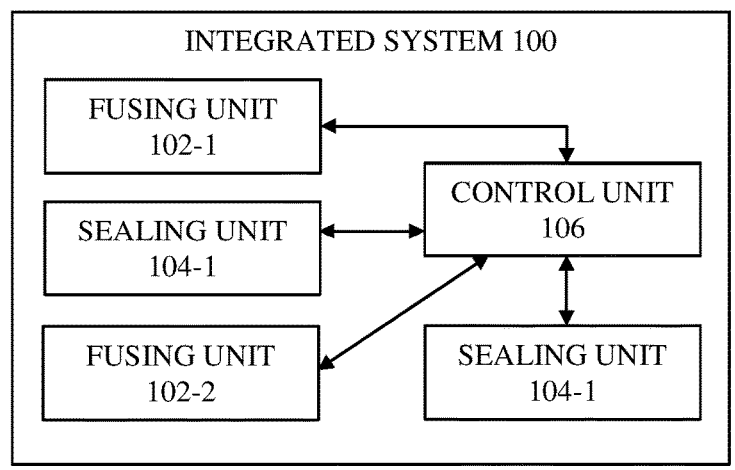
FIG. 1 is a block diagram representation of an integrated system for sealing and fusing multiple tubes in accordance to some embodiments.

FIG. 1 is a block diagram representation of an integrated system 100 for sealing and fusing multiple tubes in accordance to some embodiments. The tubes that are fused and sealed may include thermoplastic tubes and/or made of materials such as polyvinylchloride, polypropylene and so on. The integrated system 100 includes one or more fusing units (i.e. a fusing unit 102-1 and a fusing unit 102-2), a sealing unit 104 (i.e. a sealing unit 104-1 and a sealing unit 104-2) and a control unit 106. The control unit 106 controls the operation of the fusing units 102-1 and 102-2 and the sealing units 104-1 and 104-2. The control unit 106 may be powered by a power supply unit. In certain embodiments the control unit 106 may be connected to the fusing units 102-1 and 102-2 and the sealing units 104-1 and 104-2 using power cables with feedback capabilities. The feedback enables the control unit 106 to effectively control the functions of the fusing units 102-1 and 102-2 and the sealing units 104-1 and 104-2. The fusing units 102-1 and 102-2 are configured to cut ends of two tubes and fuse their respective cut ends of the tubes. The tubes may be cut simultaneously. A fusing unit is configured to push the tubes against each other at their cut ends to fuse them. Further an end of a tube of the multiple tubes is sealed using the sealing unit. In some embodiments the fusing unit and the sealing unit may be configured within a single device such as the integrated system 100. The integrated system 100 may be arranged or configured as a table top system and a handheld system. It may be noted that the subsequent explanation and figures describe the integrated system for sealing and fusing multiple tubes configured in a handheld device according to various embodiments. However, the fusing unit and the sealing unit may be arranged and configured in any other fashion other than in the form of the handheld device such as a table top device. Further the integrated system (i.e. the integrated system 100) may include multiple fusing units (i.e. the fusing units 102-1 and 102-2) and multiple sealing units (the sealing units 104-1 and 104-2) which are controlled by a control unit such as the control unit 106. The sealing units 104-1 and 104-2 may be configured as a table top device and/or a handheld device in any different combinations. Further the fusing units 102-1 and 102-2 may be configured as a table top device and/or a handheld device in any different combinations. In some embodiments the control unit 106 may be connected to the fusing units 102-1 and 102-2 and the sealing units 104-1 and 104-2, e.g. using multiple power line cables.

Figure 2:
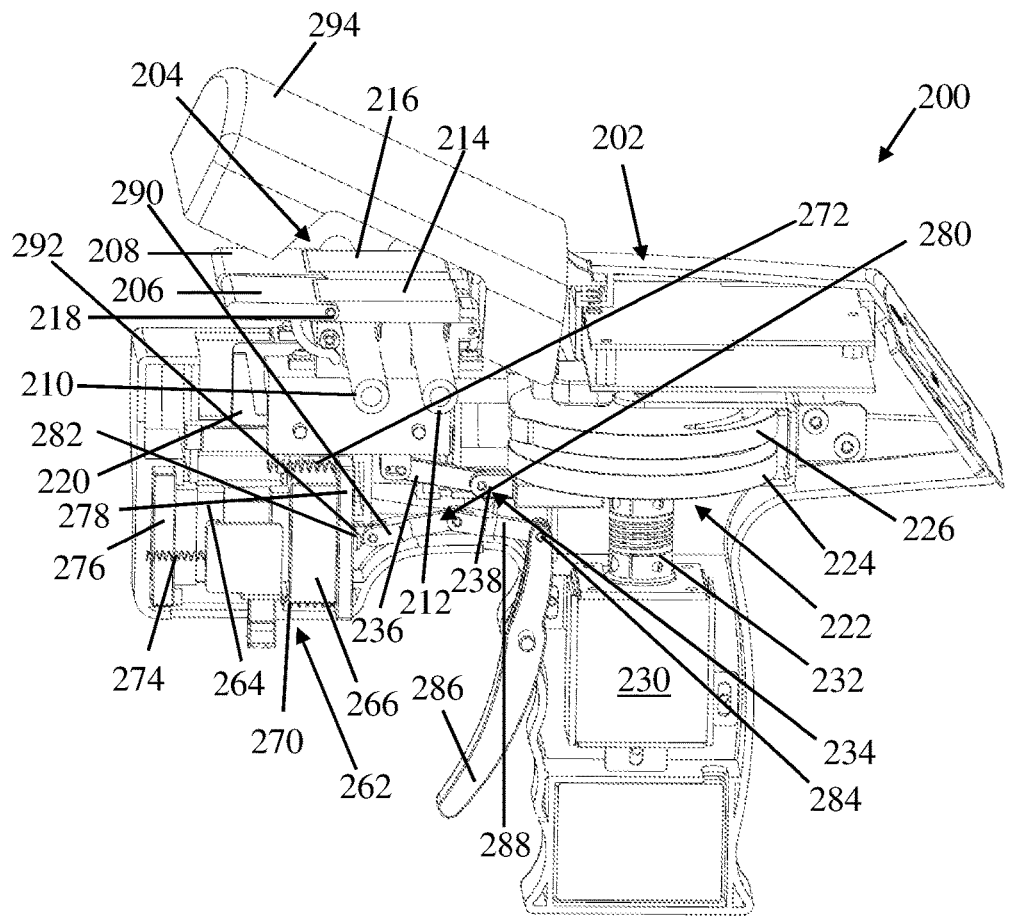
FIG. 2 is a schematic illustration of an integrated system for sealing and fusing multiple tubes configured in a handheld device according to certain embodiments.
Figure 3:
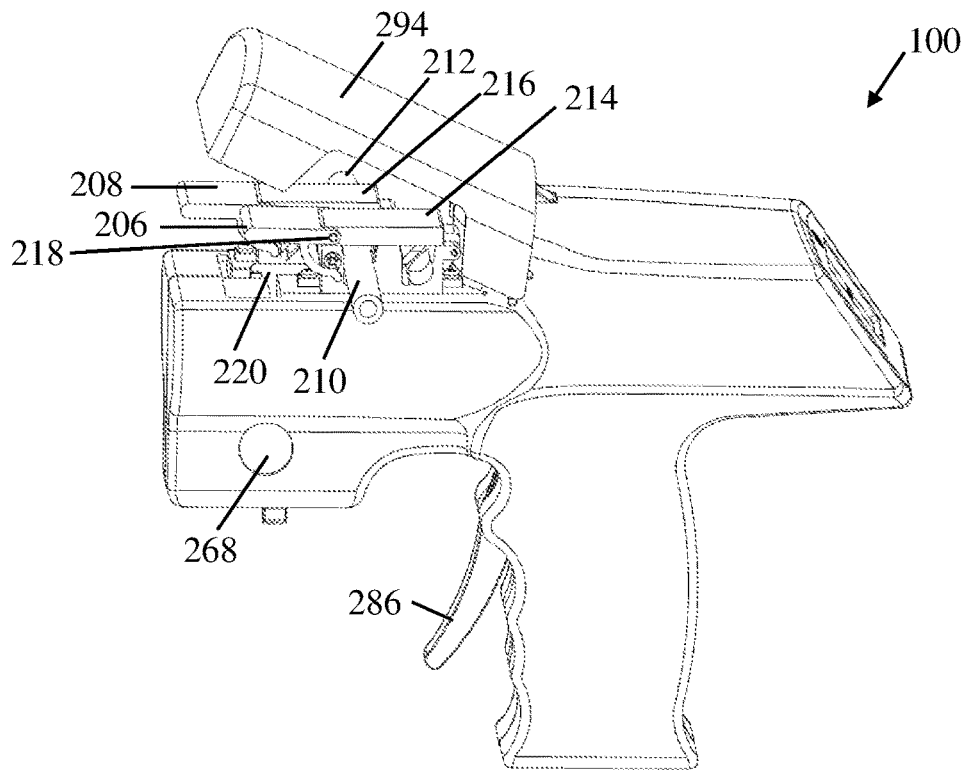
FIG. 3 is a schematic illustration of the integrated system for sealing and fusing multiple tubes configured in the handheld device to align the cut ends of the tubes according to some embodiments.

FIG. 2 is a schematic illustration of an integrated system 200 for sealing and fusing multiple tubes configured in a handheld device 202 according to some embodiments. The integrated system 200 includes a fusing unit 204. The fusing unit 204 includes two holders such as a holder 206 and a holder 208. The holders 206 and 208 are capable of receiving two tubes i.e. a tube 210 and a tube 212 respectively. The holders 206 and 208 have respective covers 214 and 216 that can be closed with respect to a point 218. The covers 214 and 216 may be hingedly coupled to the point 218. The covers 214 and 216 may be clamps or any other locking units that can ensure that the tubes 210 and 212 are held securely in their respective holders. A cutting blade 220 is positioned proximally below the holders 206 and 208. The cutting blade 220 is operated by a driving assembly 222. The cutting blade 220 is moved in a vertical direction to pass between the holders 206 and 208 to cut the tubes 210 and 212. In certain embodiments the cutting blade 220 is in a hot state, such as at a temperature sufficient to melt the tubes. The cut ends of the tubes 210 and 212 needs to be arranged opposite each other. Thus the driving assembly 222 moves one holder with respect to the other to align the tubes. For example, the holder 208 moves to align the cut end of the tube 212 opposite to the cut end of the tube 210 as shown in FIG. 3. The driving assembly 222 moves the holder 208 closer to the holder 206 so that the cut ends of the tube 212 and the tube 210 will come in contact with each other to fuse. The holders 206 and 208 illustrated and described herein with reference to FIG. 2 are according to certain embodiments and in other embodiments different configurations and arrangements may be possible.

Figure 4:
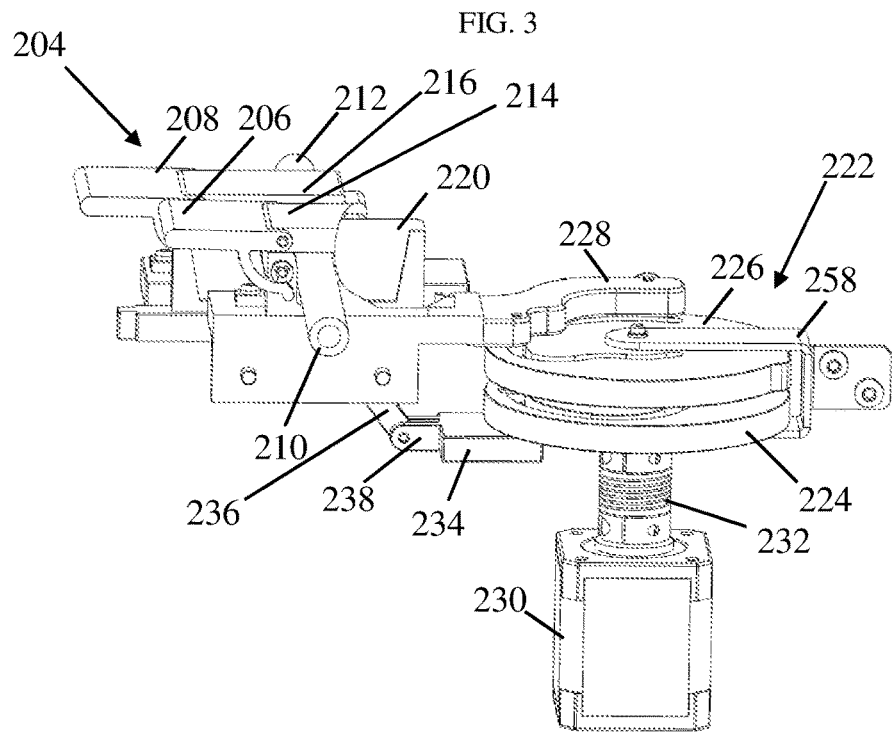
FIG. 4 is a schematic illustration of an internal view of the integrated system showing the driving assembly in accordance to certain embodiments.
Figure 5A:
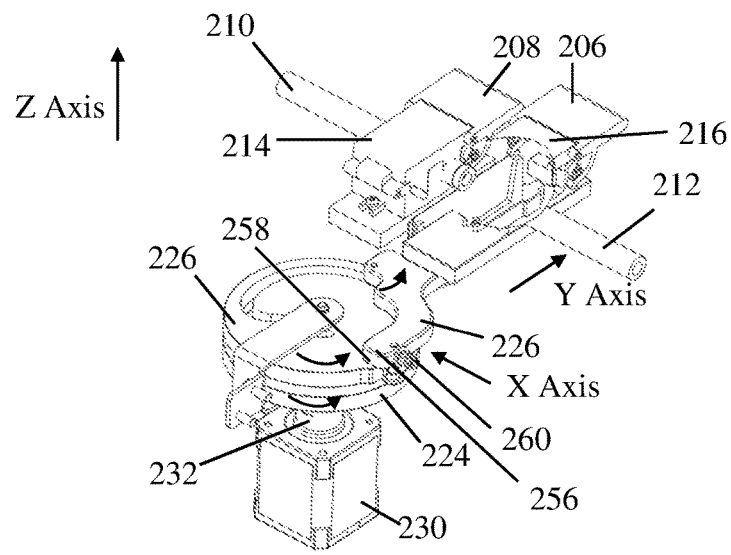
FIG. 5A is a schematic illustration of an internal view of the integrated system showing the driving assembly and position of a cutting blade in accordance to some embodiments.
Figure 6:
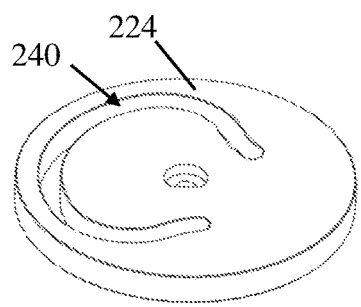
FIG. 6 is a schematic illustration of a first cam member of the driving assembly showing its cam profile in accordance with certain embodiments.
Figure 7:
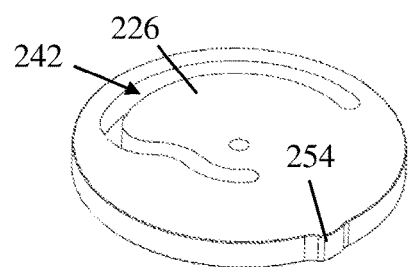
FIG. 7 is a schematic illustration of a second cam member of the driving assembly showing its cam profile in accordance with some embodiments.

Now referring to the driving assembly 222, according to some embodiments the driving assembly 222 includes cam members such as a first cam member 224 and a second cam member 226, and a carriage unit 228 movably engaged with the second cam member 226 and the holder 208. The first cam member 224 is operatively connected to the cutting blade 220. Further the second cam member 226 is operatively connected to the holder 208. The first cam member 224 and the second cam member 226 are driven by a motor unit 230 through a connecting unit 232. Once the tubes 210 and 212 are arranged in the holders 206 and 208, the motor unit 230 functions to drive the first cam member 224 to operate a blade mover 234 connecting the first cam member 224 and the cutting blade 220. When the blade mover 234 is moved, the cutting blade 220 moves in a vertical direction or orientation. The blade mover 234 may e.g. be a two bar linkage arrangement. For example, the blade mover 234 includes bar 236 and a component 238 hingedly coupled to each other at one of their ends. In certain embodiments the component 238 is an integrated component of the blade mover 234. Another end of the bar 236 is movably engaged to the first cam member 224. The first cam member 224 includes a cam track profile 240 to which the end of the blade holder 234 is movably engaged. The cam track profile 240 is shown in FIG. 6 which transmits motion to the blade mover 234. At this stage the cam profile 242 will transmit any movements i.e. this will be in a dwell or idle position. When the first cam member 224 rotates while driven by the motor unit 230, the end of the bar 236 moves along traversing the cam track profile 240. The movement along the cam track profile 240 enables the blade mover 234 (i.e. the bars 236 and 238 fold and unfold with respect to a point 242) to move the cutting blade 220 in the vertical direction i.e. 'Z' axis as shown in FIG. 4 and FIG. 5A. As discussed earlier the cutting blade 220 moves up to cut the tubes 210 and 212. The first cam member 224 and the second cam member 226 can be operated at the same time by motor unit 230. The cam track profile 240 of the first cam member 224 and the cam track profile 242 of the second cam member 226 may be designed or arranged such that while one cam track profile causes motion to drive any element or carriages other cam track profile may be in dwelling or idle position.

Figure 5B:
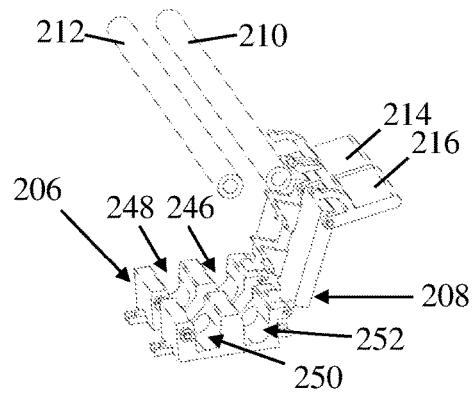
FIG. 5B is a schematic illustration of holders for holding the tubes in an open state of the integrated system in accordance to some embodiments.

Subsequently in order to align the cut ends of the tubes 210 and 212 in line the holders 206 and 208 need to be moved with respect to each other. To this end the motor unit 230 drives the second cam member 226 to rotate so that the carriage unit 228 movably engaged to a cam track profile 242 of the second cam member 226 starts operating. In some embodiments both cam members i.e. the first cam member 224 and the second cam member 226 may be operated at the same time moving blade 220 to complete the cutting of the tubes 210 and 212. The cam profile 240 of the first cam member 224 becomes dwelling or in idle state. At this stage the blade 220 is held in the same position causing no motion to the blade 220. The cam track profile 242 of the second cam member 226 is shown in FIG. 6. An end portion 244 of the carriage unit 228 moves in a 'Y' axis to traverse along the cam track profile 242 so that the holder 208 moves with respect to the holder 206 to align the cut ends of the tubes 210 and 212. The holder 206 includes a slot 246 and a slot 248 and the holder 208 includes a slot 250 and a slot 252 as shown in FIG. 5B. So while aligning the slot 246 of holder 206 is aligned to the slot 250 of the holder 208. At this stage the second cam member 226 may be idle. Once the cut ends of the tubes 210 and 212 are aligned the second cam member 226 shifts to a dwelling or idle position holding the tubes 210 and 212 in an aligned position. Further the cam track profile 240 of the first cam member 224 shifts from dwelling or idle position to transmit motion for moving the cutting blade 220 down or away from the holders 206 and 208. This is done because the cutting blade 220 may be placed between the holder 206 and 208 and thus blocks the fusing process of the cut ends of the tubes 210 and 212. However, it may be envisioned that the cutting blade 220 may be moved down or retracted before alignment of the tubes 210 and 212. Hence the order of operation of the cutting blade 220 and the alignment of holders can be performed in any manner without limiting the scope of this disclosure.

While the second cam member 226 is still driven by the motor unit 230 so that a protruding member 254 pushes the carriage unit 228 to pivot in 'X' axis direction. This enables the holder 208 to move in the 'X' axis direction to fuse the cut ends of the tubes 210 and 212. More specifically the protruding member 254 pushes an end portion 256 of the carriage unit 228 so that carriage unit 228 pivots at a point 258. A resilient member 260 (for example a spring mechanism) goes in compression due to movement of the carriage end 256. The pivoting of the carriage unit 228 with respect to the point 258 facilitates the holder 208 to move closer to the holder 206 and in turn the fusing of the cut ends of the tubes 210 and 212 occurs. As shown in FIG. 4, the first cam member 224 and the second cam member 226 are held together using a cam holder 261. The cam holder 261 is connected to the connecting unit 232.

The integrated system 100 is also capable of sealing an end of a tube. A sealing unit 262 is used to seal the end of the tube. The sealing unit 262 includes a first seal pad 264 and a second seal pad 266. The first seal pad 264 is arranged in a stationary position. The second seal pad 266 is arranged oppositely facing the first seal pad 264. The second seal pad 266 is configured to move closer to the first seal pad 264 to seal the end of the tube received between the first seal pad 264 and the second seal pad 266. The tube may be received through a window 268 in the integrated system 100 as illustrated in FIG. 3 in accordance to some embodiments. The window 268 may be a safety window with a shutter that can be opened and closed for inserting the tube. The shutter operation is controlled using a spring arrangement. The shutter can hold the tube in place once inserted into the window 268. The sealing unit 262 includes one or more springs such as a spring 270 and a spring 272 engaged to the second seal pad 266. Further one or more springs such as a spring 274 are engaged to the shutter. In certain embodiments the springs 270, 272 and 274 are compression springs. In some embodiments the second seal pad 266 may have springs arranged within this pad. Whereas the first seal pad 264 may also have springs arranged within the pad. The first seal pad 264 may be arranged on a base member 276. The spring 274 may be connected to a portion of the integrated system 100. Further the second seal pad 266 may be arranged on a base member 278. Here the springs 270 and 272 have one end connected to the base member 278.

To operate the second seal pad 266 an actuating member 280 is used which is connected to the second seal pad 266 at an end 282. Another end 284 of the actuating member 280 is connected to a trigger holder 286. Upon operating the trigger holder 286 by the user the actuating member 280 functions to move the second seal pad 266 closer and away from the first seal pad 264. In some embodiments the actuating member 280 may be a three bar linkage i.e. three bars may be hingedly coupled to each other at their ends. The actuating member 280 includes three bars 288, 290 and 292 linked to each other. The three bars extend or unfold to attain a lock pinch position for pushing the second seal pad 266 closer to the first seal pad 264. When the trigger holder 286 is pressed or pulled using a hand of the user the three bars extend substantially straight to push the second seal pad 266 closer to the first seal pad 264. The compression action of the springs 270 and 272 facilitates the second seal pad 266 to move back to its resting position in response to releasing the trigger holder 286 by the user. When the second seal pad 266 moves back the three bars 288, 290 and 292 gets folded at positions they are linked to each other to be in at its position. The springs 270 and 272 enable the second seal pad 266 and the spring 274 enables operation of a window shutter. Due to varying deflection capability of the first seal pad 264 and the second seal pad 266 different sized tubes can be placed between them for sealing. The arrangement and configuration of the sealing unit 262 as described herein is according to certain embodiments and in other embodiments different arrangements of the sealing unit may be configured within the integrated system 100.

The integrated system 200 may include a lid 294 that can be opened to access the internal view of the integrated system 200 and for safety purpose during fusing operation as shown in FIG. 2 and FIG. 3.

Figure 8:
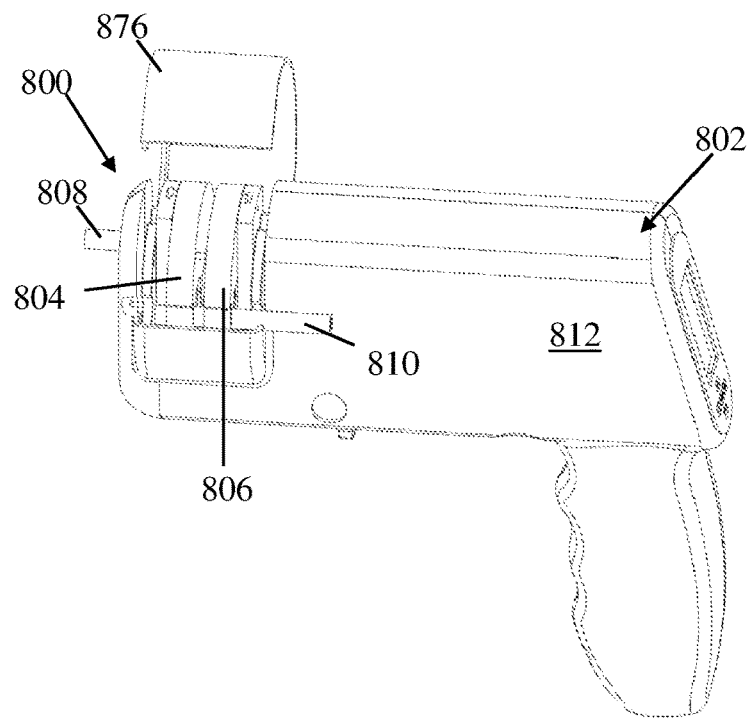
FIG. 8 is a schematic illustration of an integrated system for sealing and fusing multiple tubes configured in a handheld device according to other embodiments.

FIG. 8 is a schematic illustration of an integrated system 800 for sealing and fusing multiple tubes configured in a handheld device 802 according to other embodiments. The handheld device 802 includes multiple rotary holders such as a rotary holder 804 and a rotary holder 806. Each rotary holder has a slot for receiving a tube of the multiple tubes. A tube 808 may be loaded through a front portion of the handheld device 802 and a tube 810 may be loaded through a side portion of the handheld device 802. The handheld device 802 has tube windows for at its front portion and the side portion of a covering 812. The rotary holder 804 includes a receiving slot 814 for receiving the tube 808. The tube 808 passes through the receiving slot 814 and then passes through a receiving slot 816 in the rotary holder 806. The rotary holder 806 also has a receiving slot 818 through which the tube 810 passes when received. The tube 810 also passes through a receiving slot 820 in the rotary holder 804. Each tube passes through slots in two rotary holders so that it is securely placed in the handheld device 802. This is illustrated in an exploded view of the integrated system 800 of the handheld device 802 in FIG. 9 according to some embodiments.

Figure 10:
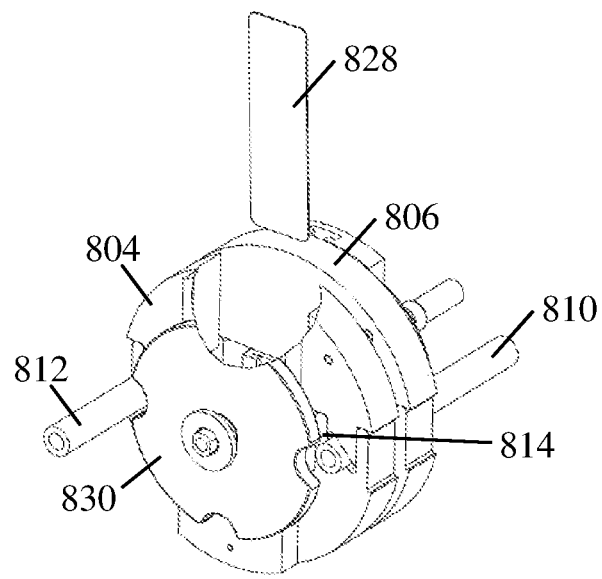
FIG. 10 is a schematic illustration of rotary holders and a cutting blade positioned between the rotary holders configured within the integrated system shown in FIG. 8 according to certain embodiments.

The rotary holders 804 and 806 may have a circular configuration as shown in FIG. 8. The rotary holder 806 is arranged on a connecting shaft 854 connected to a driving assembly 824. The rotary holder 804 is always stationary and the rotary holder 806 rotates when driven by the driving assembly 824. The connecting rod 822 may have an end 826 connected to a cutting blade 828. When arranged in the handheld device 802 the cutting blade 828 is positioned between the rotary holders 804 and 806 as shown in FIG. 10. FIG. 10 shows the rotary holders 804 and 806 with the cutting blade 828 in a disassembled position. The rotary holder 804 is positioned proximal to the cutting blade 828 from the front portion of the handheld device 802. The rotary holders 804 and 806, and the cutting blade 828 are arranged between two supporting members i.e. a supporting member 830 and a supporting member 832. The supporting members 830 and 832 also lock and unlock the holders 804 and 806. The supporting members 830 and 832 have grooves for receiving the tubes 808 and 810 for supporting them. For example, the supporting member 832 includes grooves 834, 836, 838 and 840. When the tube 810 passes through the receiving slot 818 then it also passes through the groove 834. The groove 834 positions the tube 810 in place and also guides the tube 810 when the rotary holder 806 rotates. The tube 808 passing through the receiving slot 814 also passes through the groove 838. The groove 838 positions the tube 808 in place and also guides the tube 808 when the rotary holder 804 rotates.

Figure 9:
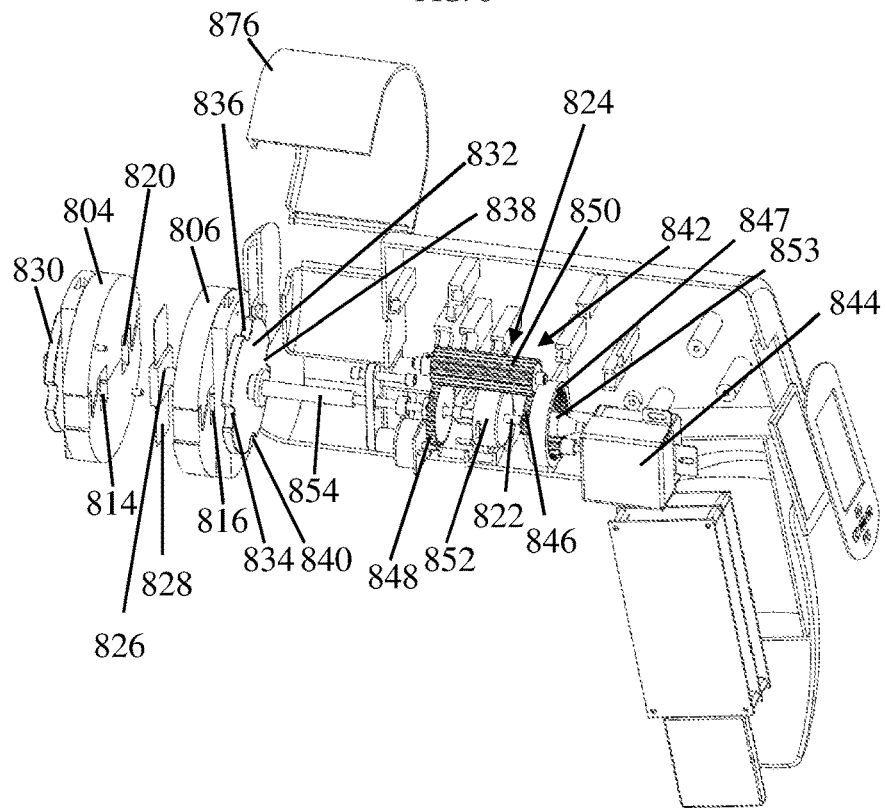
FIG. 9 is a schematic illustration of an exploded view of the integrated system shown in FIG. 8 according to some embodiments.
Figure 11:
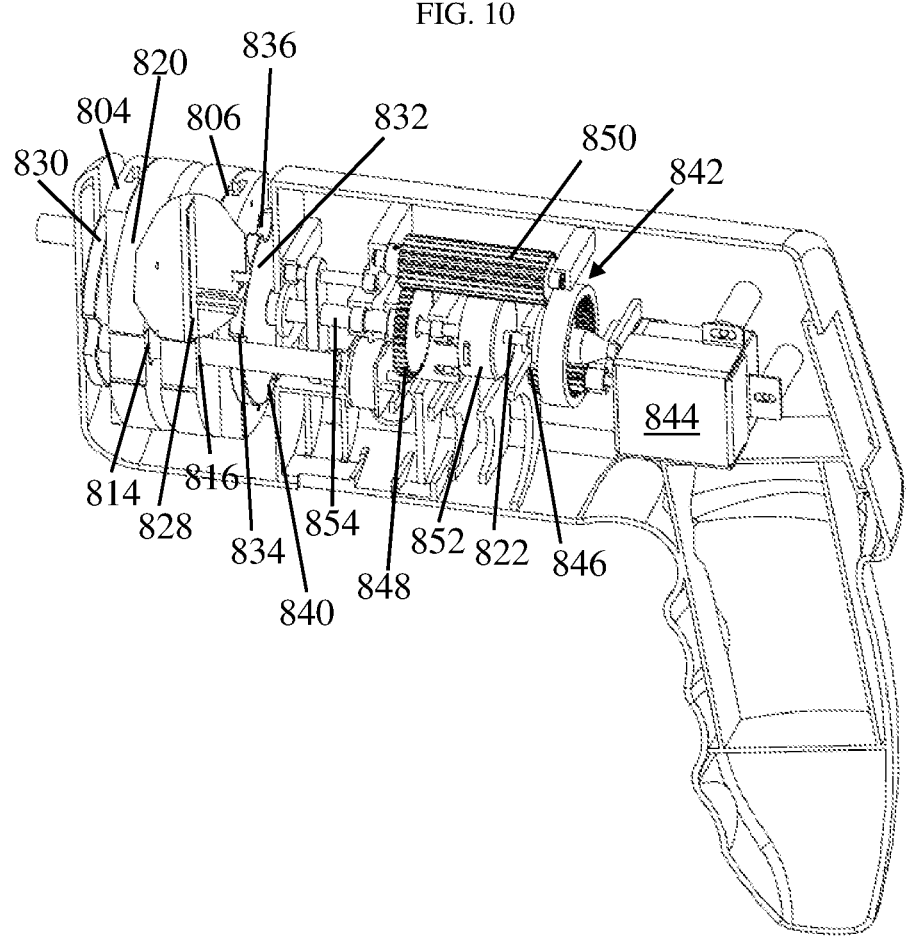
FIG. 11 is a schematic illustration of an internal view of the integrated system shown in FIG. 8 showing an arrangement of a driving assembly according to some embodiments.
Figure 12:
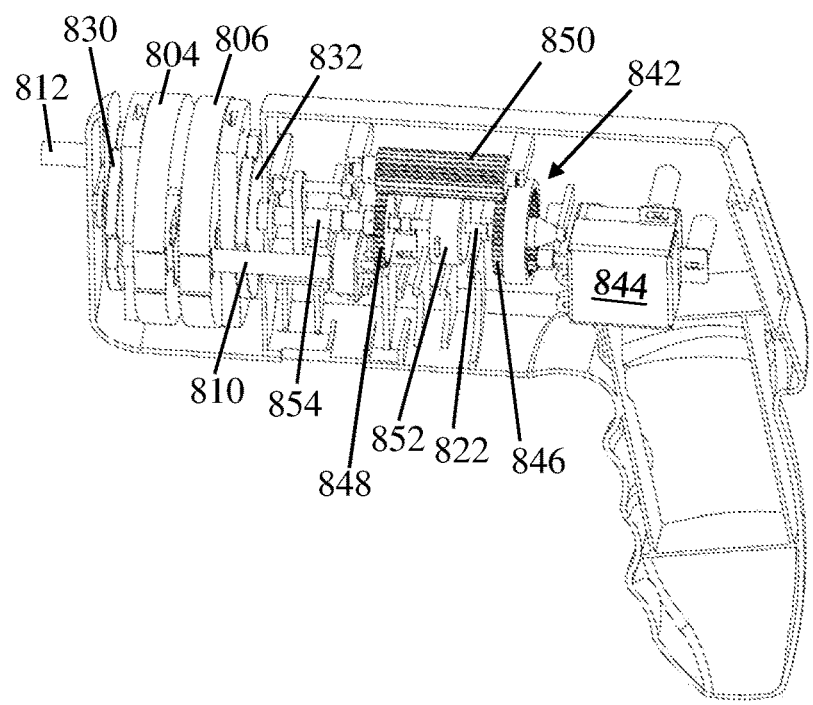
FIG. 12 is a schematic illustration of an internal view of the integrated system shown in FIG. 8 showing a rotation of a cutting blade for cutting tubes according to certain embodiments.
Figure 13:
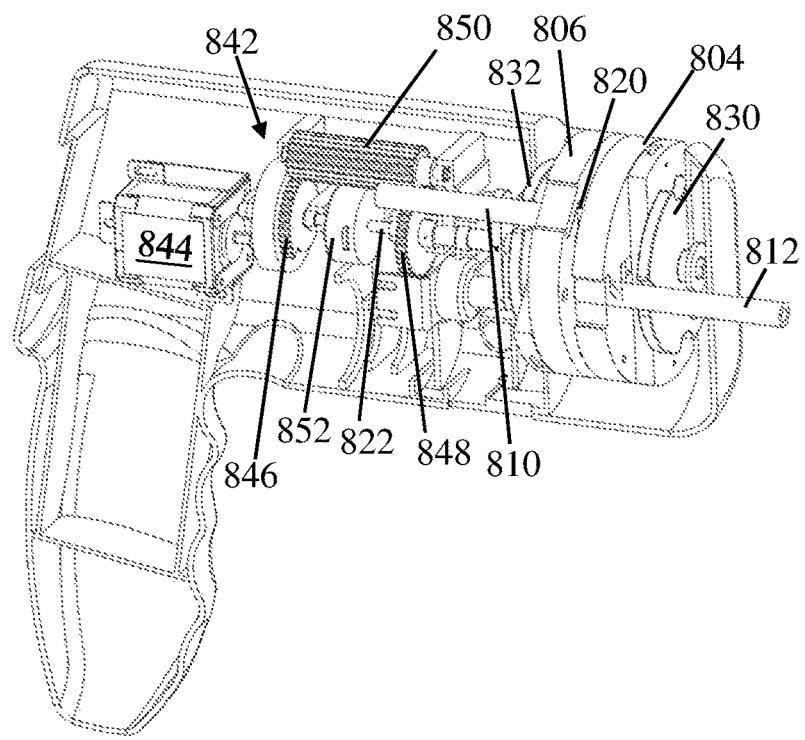
FIG. 13 is a schematic illustration of an internal view of the integrated system shown in FIG. 8 showing rotation of rotary holders for aligning the cut ends of the tubes opposite to each other according to some embodiments.
Figure 14:
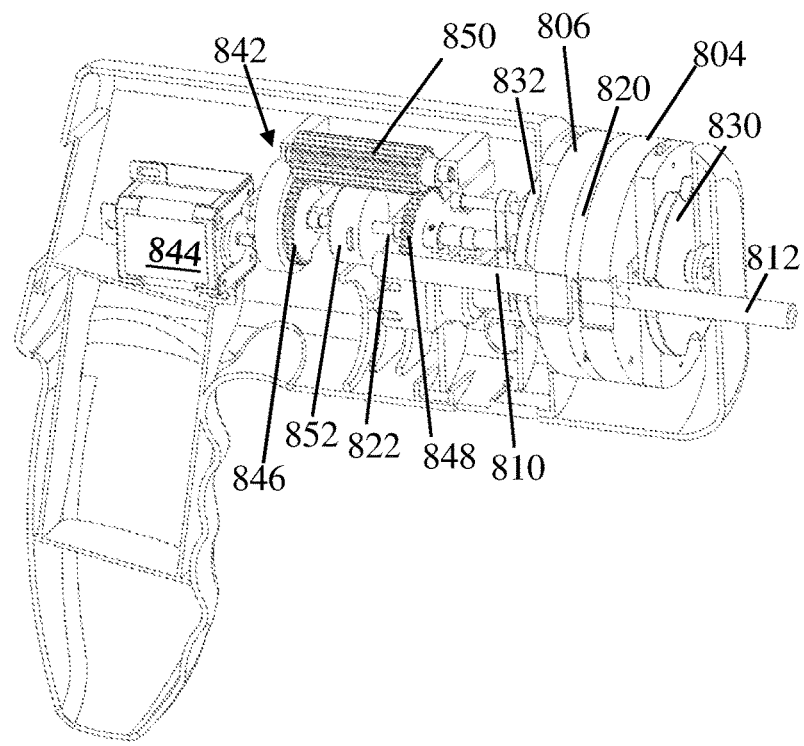
FIG. 14 is a schematic illustration of an internal view of the integrated system shown in FIG. 8 showing cut ends of the tubes aligned opposite to each other according to certain embodiments.

The driving assembly 824 can include a gear train 842 and a motor 844 driving the gear train 842 as shown in FIG. 9. The gear train 842 includes the connecting rod 822 connected to the motor 844 that operates the gear train 842. The gear train 842 includes multiple gears i.e. a sector gear 846, an internal gear 847, an aligning gear 848, a pinion gear 850 and an encoder 852. The sector gear 846, the pinion gear 850 and the encoder 852 are mounted on the connecting rod 822. In this embodiment of the handheld device 800 all the movements of the cutting blade 828 and movements of the rotary holders 804 and 806 are performed along a single axis. Initially the sector gear 846 may not be engaged to the pinion gear 850. At this stage the cutting blade 828 may be in a position as shown in FIG. 11. The pinion gear 850 is arranged to mesh with the aligning gear 848 and configurable to mesh with the sector gear 846. In an embodiment the sector gear 846 is a 180° sector gear. As the sector gear 846 connected to the internal gear 847. The motor 844 drives the internal gear 847, the sector gear 846 and the pinion gear 850. The sector gear 846 is mounted on the connecting rod 822 connected to the cutting blade 828. A rotary connector 853 connects the internal gear 847 and the motor 844 to supply power through the connecting rod 822. When the fusing cycle starts, the sector gear 846 is rotated by the connecting rod 822. However, the sector gear 846 may not be engaged with the pinion gear 850 at this stage. The cutting blade 828 is rotated to cut the tubes 808 and 810 as shown in FIG. 12. The cutting blade 828 may rotate at an angle 90° as compared to its position shown in FIG. 11. Once the tubes 808 and 810 are cut then the cut ends of tubes need to be aligned to each other to fuse. Thus the sector gear 846 engages with the pinion gear 850 when the connecting rod 822 is rotated. The sector gear 846 drives the pinion gear 850 which in turn drives the aligning gear 848. The aligning gear 848 is connected to the rotary holder 806 through a connecting shaft 854. When the aligning gear 848 rotates the connecting shaft 854 drives the rotary holder 806 to rotate for aligning the cut ends of the tubes 808 and 810 opposite to each other as illustrated in FIG. 13. The cutting blade 828 may also rotate along with the tubes 808 and 810 at this stage. More specifically the receiving slot 818 holding the cut end of the tube 810 is rotated to align with the receiving slot 814 holding the cut end of the tube 808. Thereafter the sector gear 846 disengages from the pinion gear 850 and the cutting blade 828 is rotated to its original position. In an embodiment the cutting blade 828 may rotate at 90° to attain the original position as shown in FIG. 10.

Figure 15:
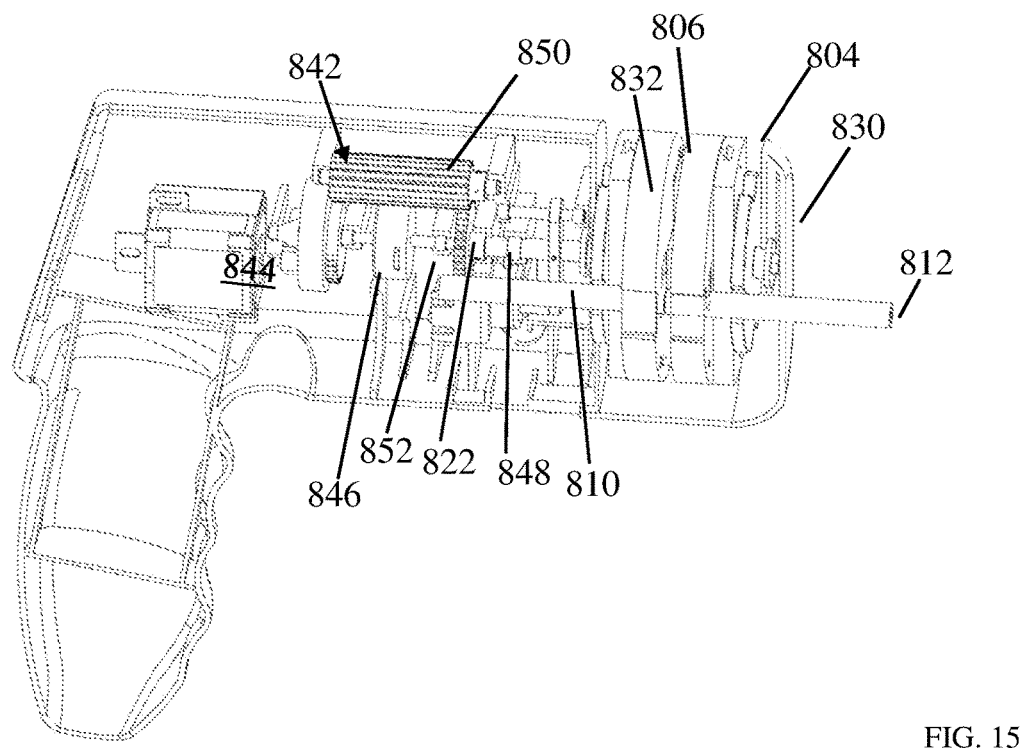
FIG. 15 is a schematic illustration of an internal view of the integrated system shown in FIG. 8 showing cut ends of the tubes fused against each other according to some embodiments.

For fusing the cut ends of the tubes 808 and 810, a fuser solenoid 856 may be used according to certain embodiments as shown in FIGS. 9 and 11. The fuser solenoid 856 is connected to the rotary holder 806 through a connector 858. The connector 858 may be engaged with connecting shaft 854. The fuser solenoid 856 is activated to move the rotary holder 806 closer to the rotary holder 804 with the help of the connector 858. In more detail when the fuser solenoid 856 is activated the connector 858 pushes the connecting shaft 854 thereby to move the rotary holder 806 closer to the rotary holder 804. As a result, the cut ends of the tubes 808 and 810 are fused against each other as illustrated in FIG. 15. It may be envisioned that the fuser solenoid arrangement as described herein is according to one embodiment, and thus other arrangements without limiting to electrical or mechanical or electromechanical units or arrangements may be configured in the handheld device to fuse the tubes without departing from the scope of this disclosure.

Figure 16:
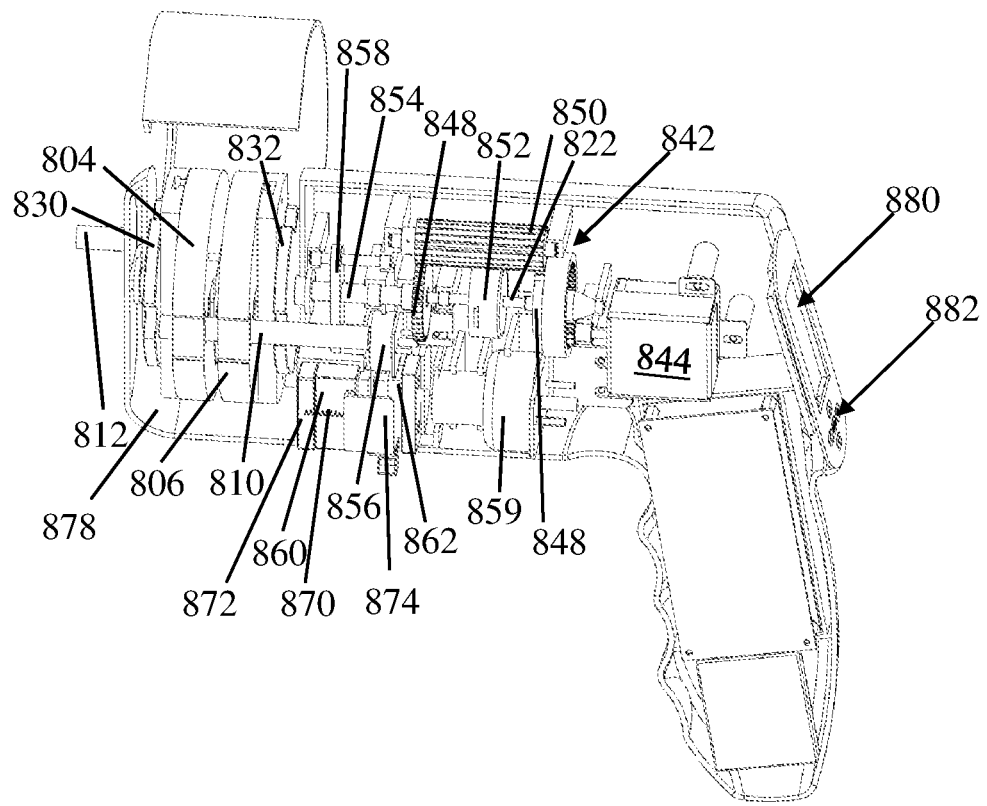
FIG. 16 is a schematic illustration of an internal view of the integrated system shown in FIG. 8 showing the fusing unit and sealing unit according to certain embodiments.

Now considering the case of sealing of tubes, a sealing unit 859 may be presented within the integrated system 800 as illustrated in FIG. 16 according to some embodiments. The sealing unit 859 can include a first seal pad 860 arranged in a stationary position and a second seal pad 862 arranged oppositely facing the first seal pad 860. The second seal pad 862 is configured to move closer to the first seal pad 860 to seal and end of the tube placed between these seal pads. A seal solenoid 864 is connected to the second seal pad 862 and controls its movements. So when the end of the tube is placed between the first seal pad 860 and the second seal pad 862, the seal solenoid 864 functions to push the second seal pad 864 closer to the first seal pad 860 thereby sealing the end of the tube.

The sealing unit 859 can include one or more springs such as a spring 866 and a spring 868. Further, one or more springs such as a spring 870 can be engaged to the window shutter. In an embodiment the springs 866, 868 and 870 are compression springs. In an embodiment the second seal pad 862 may have springs arranged within this pad. Whereas the first seal pad 860 may also have springs arranged within the pad. The first seal pad 860 may be arranged on a base member 872. The spring 870 may be connected to the base member 872. Further the second seal pad 862 may be arranged on a base member 874. Here the springs 866 and 868 have one end connected to the base member 874. The springs 866 and 868 enable the second seal pad 862 and the spring 870 enables the window shutter to move to its respective position to accommodate an end of the tube. Due to varying deflection capability of the first seal pad 860 and the second seal pad 862 different sized tubes can be placed between them for sealing. The arrangement and configuration of the sealing unit 858 as described herein is according to an embodiment and in other embodiments different arrangements of the sealing unit may be configured within the integrated system 800.

The handheld device 800 may also include a covering lid 876 that can be opened to access the rotary holders 804 and 806. The covering lid 876 may be hingedly coupled to a body 878 of the handheld device 800. In an embodiment the covering lid 876 may extend substantially throughout a length of the handheld device 800. The integrated system 800 can also suitably include a display unit 880 and an input unit 882. The display unit 880 may present various parameters associated with fusing and sealing of the tubes, controlling functions associated with sealing and fusing process, different operations/functions (e.g. fusing or sealing) associated with the handheld device and so on. A user can use the input unit 882 for selecting the operations or functions to be performed by the handheld device 800, parameters to be selected for controlling fusing and sealing functions and so on. The input unit 882 can include multiple keys that can be used by the user.

Figure 17:
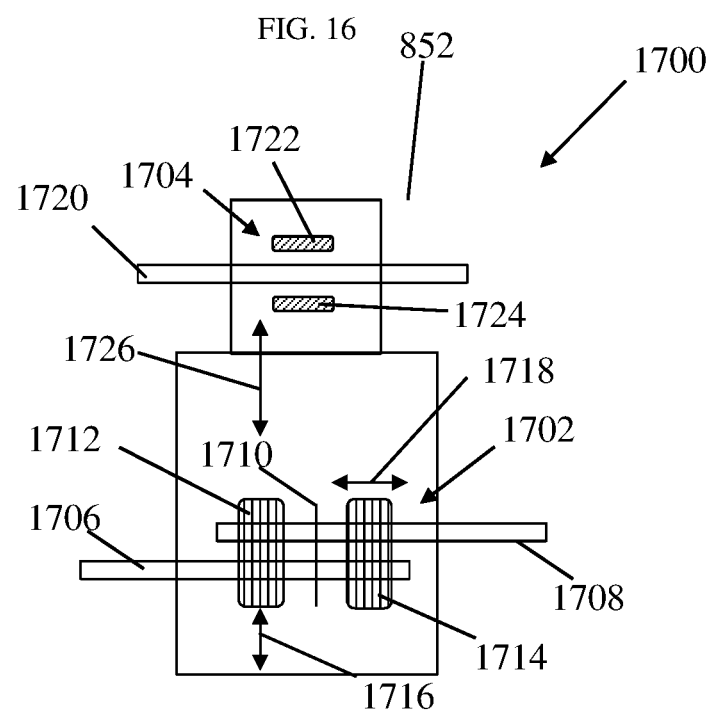
FIG. 17 is a block diagrammatic representation of an integrated system having a sealing unit and a fusing unit according to other embodiments.

FIG. 17 is a block diagrammatic representation of an integrated system 1700 including a fusing and sealing multiple tubes in accordance to an embodiment. In an embodiment the integrated system 1700 may be configured as a table top device. The table top device can be fixed or mounted or placed on the table. The integrated system 1700 includes a fusing unit 1702 and a sealing unit 1704. In the fusing unit 1702, a tube 1706 and a tube 1708 are cut using a cutting blade 1710. The tube 1706 and the tube 1708 are positioned at a distance parallel to each other. The tubes 1706 and 1708 are arranged in a holder 1712 and a holder 1714 respectively. After cutting the tubes 1706 and 1708 the holders 1712 and 1714 are rearranged or oriented such that a cut end of the tube 1706 is aligned facing opposite each other to a cut end of the tube 1708. The holders 1706 and 1708 are moved closer to each other so that the cut ends of the tubes 1706 and 1708 fuse together. The holders 1706 and 1708 are moved in two directions shown by arrows 1716 and 1718.

An end of a tube 1720 of the multiple tubes may be positioned between two sealing pads such as a sealing pad 1722 and a sealing pad 1724. The sealing pad 1722 and the sealing pad 1724 are moved closer to each other so that the end of the tube 1720 is sealed. The sealing pad 1722 may be moved in directions indicated by arrow 1726.

Figures 18, 19:
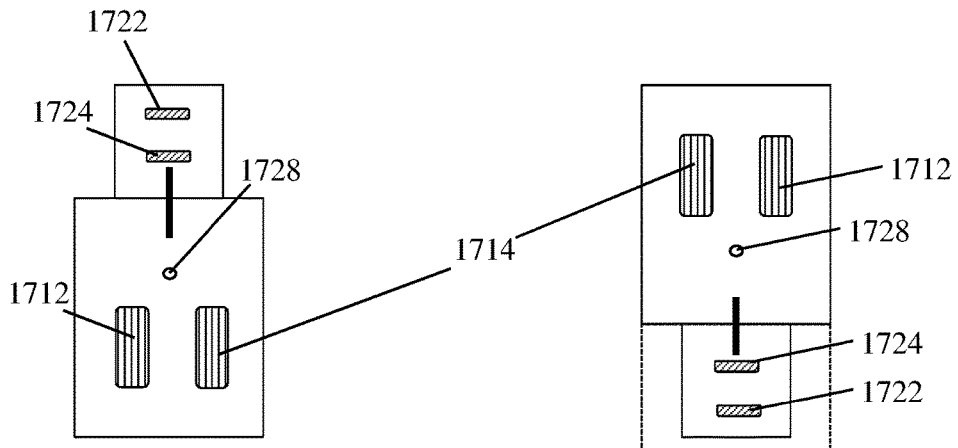
FIGS. 18 and 19 are block diagrammatic representations of the integrated system having a sealing unit and a fusing unit that can be rotatable with respect to a point according to some embodiments.

FIG. 18 is a schematic illustration of the integrated system 1700 indicating the fusing unit 1702 and the sealing unit 1704 capable of rotating with respect to a point 1728 according to an embodiment. The integrated system 1700 configured as the table top device may be placed on a table and then the fusing unit 1702 can be rotated with respect to the point 1728. In another instance the sealing unit 1704 can be rotated with respect to the point 1728. As the sealing unit 1704 and the fusing unit 1702 can be rotated with respect to the point 1728 for sake of convenience of usage by a user when placed on the table as shown in FIG. 19. The dotted line indicates that the fusing unit 1702 was rotated from an initial orientation to the current orientation (as shown in FIG. 19). Based on the orientation of the integrated system 1700 (as the table top device) placed on the table, the fusing unit 1702 or the sealing unit 1704 may be rotated to have easy and convenient access to use them by the user.

Figure 20:
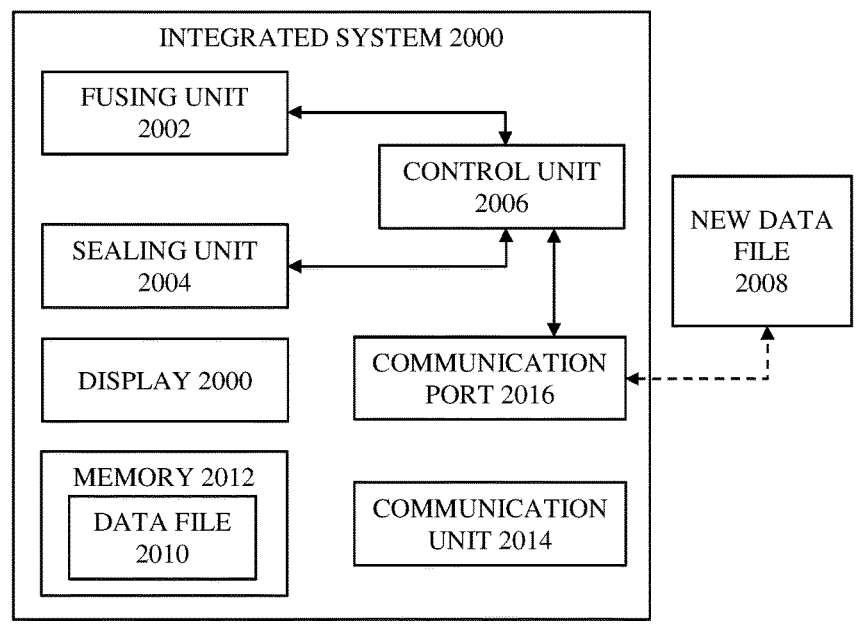
FIG. 20 is an integrated system having a sealing unit and a fusing unit according to further embodiments.

FIG. 20 is schematic illustration of a block diagram of an integrated system 2000 according to an embodiment. The integrated system 2000 includes a fusing unit 2002, a sealing unit 2004 and a control unit 2006. The control unit 2006 controls the operation of the fusing unit 2002 and the sealing unit 2004. The control unit 2006 may be powered by a power supply unit. In an embodiment the control unit 2006 may be connected to the fusing unit 2002 and the sealing unit 2004 using power cables with feedback capabilities. The feedback enables the control unit 2004 to effectively control the functions of the fusing unit 2002 and the sealing unit 2004. The fusing unit 2002 is configured to cut ends of two tubes and fuse their respective cut ends of the tubes. The tubes may be cut simultaneously. The fusing unit 2002 is configured to push against each other at their ends to fuse them. Further an end of a tube of the multiple tubes is sealed using the sealing unit 2004. As the fusing unit 2002 and the sealing unit 2004 are configured within a single device i.e. the integrated system 2000. The integrated system 2000 may be arranged or configured as a table top system and a handheld system. It may be noted that the subsequent explanation and figures describe the integrated system for sealing and fusing multiple tubes configured in a handheld device according to various embodiments. However, the fusing unit and the sealing unit may be arranged and configured in any other fashion other than in the form of the handheld device such as a table top device.

The integrated system 2000 may be also capable of updating data parameters associated with tubes and data parameters associated with fusing and sealing methodologies of the tubes according to an embodiment. A user (i.e. a customer or requester) may send raise a request for data parameters for new tubes that needs to be fused and sealed. The data parameters associated with the tubes and the data parameters associated with fusing and sealing methodologies are generated and provided to the user. The data parameters associated with the tube includes a material associated with the tube, dimension of the tube i.e. radius, length and so on.

The data parameters associated with fusing and sealing methodologies may include sealing and fusing parameters (for instance fusing parameters, fusing techniques, sealing parameters, sealing techniques and so on), sealing and fusing quality testing requirements (such as flow, tensile and pressure tests), and sample data associated with the tube. The data parameters associated with fusing and sealing methodologies and the data parameters associated with the tubes may be stored as a new data file 2008. It may be appreciated that the data parameters associated with the tube and sealing and fusing methodologies as described herein is according to an embodiment and other types of data may be also considered in other embodiments.

The integrated system 2000 may include a data file 2010 that includes data parameters associated with tubes used currently and data parameters associated with fusing and sealing methodologies associated with the current tubes. The data file 2010 may be old data that may need updating and accordingly the new data may be available in the form of the new data file 2008. The data file 2010 may be stored in a memory 2012. The new data file 2008 may be available through various sources such as a website, a database system and so on. The new data file 2008 may be downloaded into the integrated system 2000. In an embodiment the communication unit 2014 may be a wireless communication unit for receiving the new data file 2008. The wireless communication unit may be based on different wireless techniques such as Wi-Fi®, Bluetooth™ and so on. In another embodiment the integrated system 2000 includes a communication port 2016 that may be used to transfer the new data file 2008 into the integrated system 2000. The communication port 2016 may be but are not limited to a serial port, a universal serial bus (USB) port, Ethernet, and FireWire™. The new data file 2008 is stored in the memory 2012 along with the data file 2010. In another embodiment the new data file 2008 may erase the data file 2010 and update the memory 2012 with the new data. As a result, the user can conveniently download a new data file to update the integrated system 2000 and use this for fusing and sealing of tubes.

Further the control unit 2006 for controlling the operations of the fusing and sealing of the tubes can be implemented in an integrated system 100 in accordance with an embodiment. The control unit 2006 includes a processor. The processor is hardware. For example, the processor 2502 can be implemented by one or more integrated circuits, logic circuits, microprocessors or controllers or microcontrollers. The memory 2012 may be a Synchronous Dynamic Random Access Memory (SDRAM), Dynamic Random Access Memory (DRAM), RAMBUS Dynamic Random Access Memory (RDRAM) and/or any other type of random access memory device, or any hardware memory.

The processor may communicate with a fusing unit and a sealing unit through a circuitry. The processor may be programmed and configured to operate the fusing unit and the sealing unit based on settings input by a user. A display 2018 may be present through which the settings can be input. The display 2018 is controlled by the control unit 2006 through the circuitry. The display 2018 is also configured to control indicators provided in the integrated system 2000 for each units i.e. the fusing unit and the sealing unit. These indicators may show the different stages such as start-up, ready, running, warning and so on associated with operation of each unit.

The circuitry may be implemented by any type of interface standard, such as an Ethernet interface, a universal serial bus (USB), and/or a PCI express interface, a transmitter, a receiver, a transceiver, a modem and/or network interface card to facilitate exchange of data with external machines (e.g., computing devices of any kind), integrated circuits, analog or digital circuit(s), logic circuits, programmable processor(s), application specific integrated circuit(s) (ASIC(s)), programmable logic device(s) (PLD(s)) and/or field programmable logic device(s) (FPLD(s)).

The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a floppy disk drive, optical disk drive, and the like. The storage device may also be other similar means for loading computer programs or other instructions into the computer or processor. As used herein, the term "computer" or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer". The computer or processor executes a set of instructions that are stored in one or more storage elements, in order to process input data. The storage elements may also store data or other information as desired or needed. The storage element may be in the form of an information source or a physical memory element within a processing machine.

The methods described herein can be performed using a processor or any other processing device. The method steps can be implemented using coded instructions (e.g., computer readable instructions) stored on a tangible computer readable medium. The tangible computer readable medium may be for example a flash memory, a read-only memory (ROM), a random access memory (RAM), any other computer readable storage medium and any storage media. Although the method of fusing and sealing of tubes is explained with reference to the flow chart of figures, other methods of implementing the method can be employed. For example, the order of execution of each method steps may be changed, and/or some of the method steps described may be changed, eliminated, divide or combined. Further the method steps may be sequentially or simultaneously executed for controlling the operations of fusing and sealing of tubes in an integrated system 100 or the integrated system 2000.

From the foregoing, it will appreciate that the above disclosed integrated system for fusing and sealing of multiple tubes. The integrated system may include a control unit that can control the operation of different sealing units and fusing units simultaneously. The sealing units and fusing units are configured as separate devices connected to the control unit. Further the integrated system may be arranged as a single device which has a fusing unit and the sealing unit. The single device may be handheld device or a table top device that can be conveniently used by the user. This is because it is portable and light weight so that it can be transported from one location to another conveniently. Ultimately these advantages result in reduced cost and efficient handling of the integrated system for fusing and sealing of multiple tubes.

This written description uses examples to disclose the invention, including the best mode, and also to enable any person skilled in the art to practice the invention, including making and using any computing system or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. An integrated system for fusing and sealing a plurality of tubes, the integrated system comprises:
    at least one fusing unit, each fusing unit comprising at least two holders, wherein each holder is capable of receiving and holding a portion of a tube of the plurality of tubes, a cutting blade for cutting a portion of the tube received in each holder of the at least two holders simultaneously, and a driving assembly comprises a first cam member operatively connected to the cutting blade and a second cam member operatively connected to the at least two holders, and the fusing unit being configured to:
    fuse the portion of the tube in each holder together along their respective cut ends;
    at least one sealing unit, wherein a sealing unit is configured to seal an end of a tube of the plurality of tubes; and
    a control unit for controlling functions of the at least one fusing unit and the at least one sealing unit.

2. The integrated system of claim 1, wherein
    the cutting blade is a heated blade; and
    the driving assembly is further configured to:
    align the at least two holders for orienting the respective cut ends of the portions of the tubes to face each other; and move the ends of the tubes to contact each other for fusing.

3. The integrated system of claim 2, wherein each holder of the at least two holders have at least one elongated slot for holding a tube of the at least two tubes.

4. The integrated system of claim 3, wherein the driving assembly further comprises:
a carriage unit movably engaged with the second cam member and the at least two holders;
a blade mover connected to the first cam member and the cutting blade;
a motor unit operatively connected to the first cam member and the second cam member, wherein during operation the motor unit:
drives the first cam member to operate the blade mover for moving the cutting blade in a vertical axis for cutting a portion of the at least two tubes held in the at least two holders; and
drives the second cam member to operate the carriage unit for aligning the at least two holders so as to orient the respective cut ends of the tubes to face each other.

5. The integrated system of claim 4, wherein:
the first cam member comprises a cam track profile, wherein an end of the blade mover is movably engaged to the cam track; and the second cam member comprises a cam track profile, wherein the carriage unit is movably engaged to the cam track profile.

6. The integrated system of claim 5, wherein the second cam member comprises a protruding member, wherein in response to driving the second cam member the protruding member directs the carriage unit for aligning the at least two holders to fuse the at least two tubes together along their respective cut ends.

7. The integrated system of claim 6, further comprising a resilient unit for applying tension force on the carriage unit for bringing the carriage unit back to an original position for another fusing operation.

8. The integrated system of claim 7, wherein the sealing unit comprises: a first seal pad arranged in a stationary position; a second seal pad arranged oppositely facing the first seal pad, wherein the second seal pad is configured to move closer to the first seal pad to seal an end of the tube of the plurality of tubes positioned between the first seal pad and the second seal pad; and a seal driving assembly connected to the second seal pad for controlling the movement of the second seal pad.

9. The integrated system of claim 8, wherein the sealing unit further comprises:
at least one spring engaged to the second seal pad for providing pressure to seal the end of tube; and at least one spring engaged to the first seal pad, wherein the at least one spring engaged to the second seal pad and the at least one spring engaged to the second seal pad are configured to deflect for accommodating the end of the tube between the first seal pad and the second seal pad.

10. The integrated system of claim 9, wherein the seal driving assembly comprises:
a trigger holder operable by a user; and
an actuating member engaged to an end of the trigger holder and connected to the second seal pad, wherein upon operating the trigger holder the actuating member moves the second seal pad.

11. The integrated system of claim 3, wherein each holder of the at least two holders is a rotary holder, wherein the rotary holder having a slot for receiving and holding a tube.

12. The integrated system of claim 11, wherein:
a first holder and a second holder in the at least two holders are concentrically arranged; and the cutting blade is positioned between the first holder and the second holder.

13. The integrated system of claim 12, wherein the driving assembly comprises:
a gear train connected to the first holder, the second holder and the cutting blade;
and a motor for operating the gear train.

14. The integrated system of claim 13, wherein the gear train comprises:
a connecting shaft connected to the motor;
a sector gear mounted on the connecting shaft;
an aligning gear mounted on the connecting shaft; a pinion gear arranged meshing with the aligning gear and configurable to mesh with the sector gear; and
an encoder mounted on the connecting shaft to collect and send feedback on the fusing function to the control unit.

15. The integrated system of claim 14, wherein the second holder is oriented with respect to the first holder such that a tube held by the first holder and a tube held by the second holder are spaced apart opposite to each other.

16. The integrated system of claim 15, wherein the connecting shaft rotates to rotate the aligning gear and the cutting blade for cutting the tubes held in the first holder and the second holder, wherein the sector gear is not engaged with the pinion gear.

17. The integrated system of claim 16, wherein upon rotating the connecting shaft the sector gear engages and drives the pinion gear to drive the aligning gear, wherein the aligning gear rotates the second holder to align a cut end of the tube held by the second holder opposite to a cut end of the tube held by the first holder, wherein the first holder is stationary.

18. The integrated system of claim 17, further comprising a fuser solenoid connected to the second holder, wherein the solenoid facilitates to move the second holder closer to the first holder thereby the cut end of the tube held by the second holder is fused to a cut end of the tube held by the first holder.

19. The integrated system of claim 18, wherein the sealing unit comprises: a first seal pad arranged in a stationary position; a second seal pad arranged oppositely facing the first seal pad, wherein the second seal pad is configured to move closer to the first seal pad to seal an end of the tube of the plurality of tubes positioned between the first seal pad and the second seal pad; and a seal solenoid connected to the second seal pad for controlling the movement of the second seal pad.

20. The integrated system of claim 19, wherein the sealing unit further comprises:
at least one spring engaged to the second seal pad for providing pressure to seal the end of tube; and
at least one spring engaged to the first seal pad, wherein the at least one spring engaged to the second seal pad and the at least one spring engaged to the second seal pad are configured to deflect for accommodating the end of the tube between the first seal pad and the second seal pad.

21. The integrated system of claim 20, wherein the integrated system is configured as a table top system.

22. The integrated system of claim 21, wherein the integrated system is configured as a handheld system.

23. The integrated system of claim 22, further comprising a communication unit for receiving a data parameter associated with at least one of the plurality of tubes, a fusing methodology and a sealing methodology.

24. The integrated system of claim 23, further comprising a communication port for receiving the data parameter associated with at least one of the plurality of tubes, the fusing methodology and the sealing methodology.

* * * * *